United States Patent [19]

Carlson et al.

[11] Patent Number: 5,104,206
[45] Date of Patent: Apr. 14, 1992

[54] GLOVEBOX PLUG FOR GLOVE CHANGING

[75] Inventors: David O. Carlson, Tesuque; Edward Shalkowski, Jr., Los Alamos, both of N. Mex.

[73] Assignee: The United States of America as represented by the Department of Energy, Washington, D.C.

[21] Appl. No.: 680,975

[22] Filed: Apr. 5, 1991

[51] Int. Cl.⁵ .............................................. A61G 11/00
[52] U.S. Cl. ........................................................ 312/1
[58] Field of Search ................................ 312/1; 600/21

[56] References Cited

U.S. PATENT DOCUMENTS 4,089,571  5/1978  Landy .
4,251,123  2/1981  Brackenbush et al. ................ 312/1

Primary Examiner—Joseph Falk
Attorney, Agent, or Firm—Richard J. Cordovano; Paul D. Gaetjens; William R. Moser

[57] ABSTRACT

A plug for use in plugging a glove opening of a glovebox when the glove is replaced. An inflated inner tube which is retained between flat plates mounted on a threaded rod is compressed in order to expand its diameter to equal that of the inside of the glove opening.

1 Claim, 2 Drawing Sheets

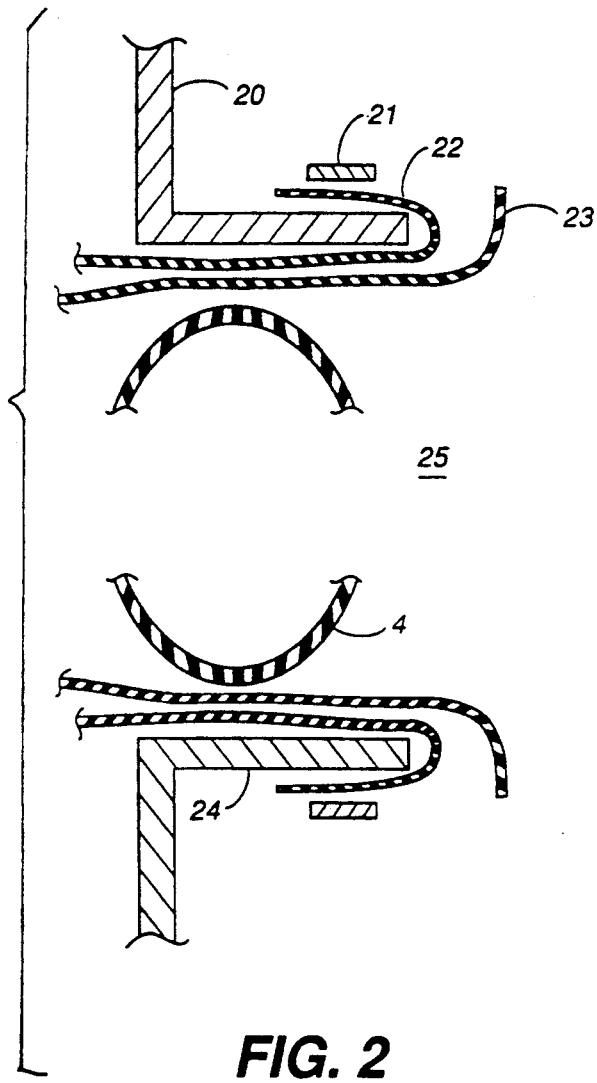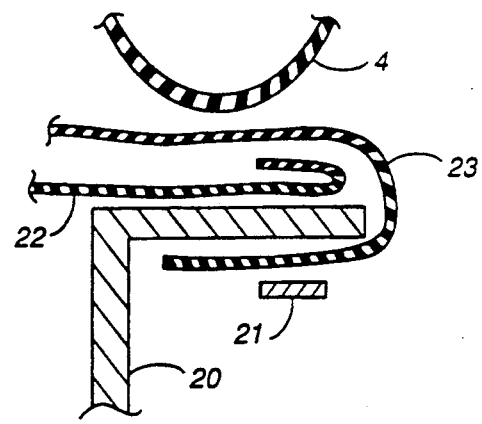
FIG. 2  FIG. 3

GLOVEBOX PLUG FOR GLOVE CHANGING

This invention is the result of a contract with the Department of Energy (Contract No. W-7405-ENG-36).

BACKGROUND OF THE INVENTION

This invention relates to the field of isolation and containment of hazardous materials and sensitive materials.

Numerous substances must be isolated from the atmosphere and from contact with people, yet must be accessible for manipulation by humans. These materials include radioactive substances, toxic substances, biological materials, pharmaceuticals, and electronic components such as chips. Gloveboxes are often used to contain and isolate these materials when they must be handled, though certain highly radioactive materials must be isolated behind leaded glass as much as 50 cm thick and handled by remotely operated mechanical manipulators. These gloveboxes are completely sealed from the atmosphere and have gloves with long cuffs, or extensions, located inside the enclosure and connected to a glove port, or opening, in a wall of the enclosure. A technician inserts his hands and forearms through the port and into the cuffed gloves and then can manipulate materials and apparatus inside the box. The glovebox may be operated at either a position or negative pressure. A small air flow through the box is usually maintained and both air entering the box and air leaving the box may pass through filters.

The gloves eventually are damaged or simply wear out and must be replaced while maintaining the integrity of the box. The inventive plug is used to close the glove opening when gloves are changed so that there is always a barrier between the contents of the glovebox and the atmosphere.

SUMMARY OF THE INVENTION

This invention is a plug for use in plugging a glove opening of a glovebox when the glove is replaced. An inflated inner tube which is retained between flat plates mounted on a threaded rod is compressed in order to expand its diameter to equal that of the inside of the glove opening.

BRIEF SUMMARY OF THE DRAWINGS

FIG. 2 is an exploded section view depicting a glove opening in a glovebox, a glove mounting flange, an old glove, a new glove being installed, and the outer portion of an inner tube of a glovebox plug. The center portion of the plug is not shown.

FIG. 3 is a section view of a portion of the outlet flange of FIG. 2 showing a step in the replacement of a glove. The drawing is exploded for ease of viewing.

DETAILED DESCRIPTION OF THE INVENTION

Figure 1:
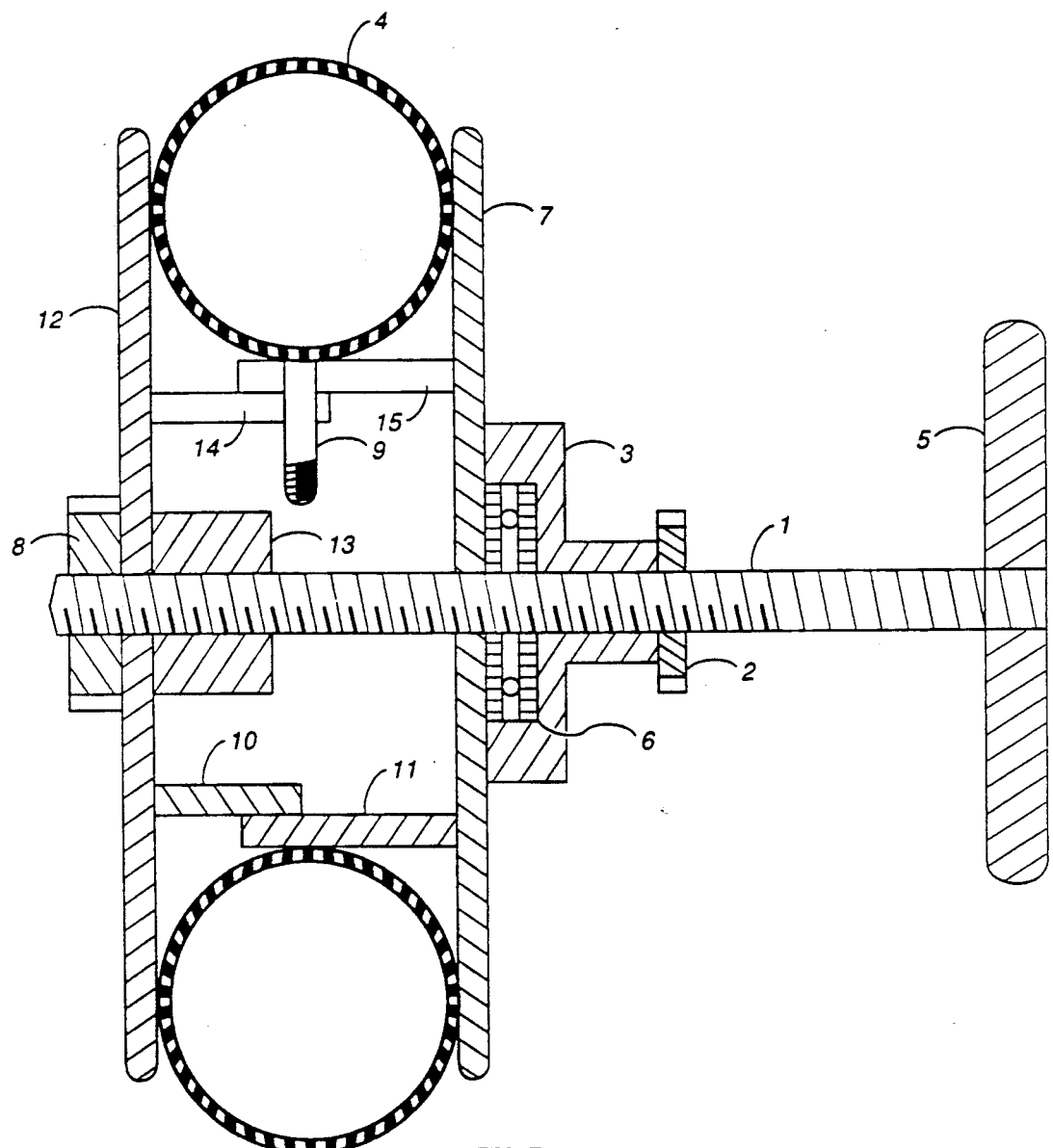
FIG. 1 is a section view of the inventive plug. The section plane passes through the rod at the center of the apparatus and is perpendicular to the flat plates of the plug. It is not drawn to scale and includes only the components useful or necessary for understanding the invention.

Referring to FIG. 1, reference no. 1 denotes a rod which has an acme thread along a portion of its length. At the non-threaded end is handle 5. Inner tube 4 is located between two flat circular plates 7 and 12. The tube is doughnut shaped and is the type used in pneumatic tires. A portion of the outside perimeter of the tube extends beyond the plates to make contact with the perimeter of a glove opening as shown in the exploded view of FIG. 2. Rod 1 passes through the center of plate 7 and bearing housing 3, which do not have screw threads but simply slide on to the rod. Stop nut 2 prevents the bearing housing from moving toward handle 5. Rod 1 passes through the center of plate 12 and hub 13, which is attached to plate 12. Hub 13 is threaded and engages the threads of rod 1. Closure nut 8 is screwed on to the end of rod 1 and has means to prevent it from turning after it is initially screwed on to the rod; for example, it may be a fiber nut or be pinned to the rod by a cotter pin. Bearing 6 is a thrust bearing which is press-fitted into bearing housing 3, which is not attached to plate 7.

When handle 5 is turned plate 12 and hub 13 move toward plate 7, thus compressing tube 4 and thereby causing it to expand around its perimeter. This expansion brings the perimeter of tube 4 into contact with the inside perimeter of a glovebox glove opening. A short length of a hollow cylinder is attached to plate 7 to serve as guide ring 11, which also serves as a stop to limit the amount of compression of the tube. In the same manner, a short length of a hollow cylinder is attached to plate 12 to serve as guide ring 10. The central longitudinal axis of each guide ring coincides with rod 1. The outside diameter of guide ring 10 is slightly less than the inside diameter of guide 11 so that guide ring 10 can slide inside of guide ring 11. As the tube is compressed, when guide 11 touches plate 12 the maximum limit of compression of the tube is reached. It can be seen from FIG. 1 that guide ring 11 is longer than guide ring 10. Guide 10 has a slot in it which is denoted by reference number 14 and guide 11 has a slot denoted by reference number 15. Each slot is parallel to the axis of the cylinder. These slots accommodate air fill connection 9 of the tube.

The diameter of plate 12 is 8.45 inches and that of plate 7 is 8.63 inches. The diameter of the glove opening to be plugged is about 8.9 inches. The inside diameter of guide ring 11 is about 4.5 inches while the outside diameter guide ring 10 is slightly less than 4.5 inches. Guide ring 11 is 1.5 inches long and guide ring 10 is 1.25 inches long. The rod has a diameter of 0.65 inches. The tube is inflated to about 5 psig when it is not in significant compression.

FIG. 2 is an exploded section view. The wall of a glovebox is denoted by reference no. 20. A old glove 22 has its cuff folded over flange 24 and secured by clamp 21. In order to change the glove, a second glove 23 is placed inside glove 22. Then the plug is put in place in opening 25. Only the outer portion of tube 4 of the plug is shown in FIG. 2. The tube is compressed and expands to completely close opening 25 by bearing against flange 24. The cuffs of both old glove 22 and new glove 23 are between the tube and the flange.

Now referring to FIG. 3, which is an exploded section view which is the same as FIG. 2, with only the bottom half of the flange and gloves shown, the process of changing gloves is taken a step further. Clamp 21 is loosened and old glove 22 is removed from around the flange and folded back as shown. New glove 23 is folded over the flange and clamp 21 is tightened around the flange. The plug is then removed: Old glove 22 is stripped off of the outside of new glove 23 and left in the glovebox for later disposal.

What is claimed is:

1. A plug for isolating the interior of a glovebox from the atmosphere when replacing a glove, said plug being comprised of:
   a. a rod having a circular cross-section which is threaded for a portion of its length starting at one end and which has a handle at the non-threaded end;
   b. a stop nut threaded onto said rod and located near the end of said threaded portion which is nearer said handle;
   c. a first circular flat plate having a diameter less than that of a glove opening of said glovebox and having a first guide ring attached to it, the plate being slidably mounted on said rod by means of a hole in the center of the plate;
   d. a bearing holder containing a thrust bearing, both slidably mounted on said rod between said stop nut and said first plate, where said bearing is in contact with said first plate;
   e. a second circular flat plate having a diameter less than that of said glovebox glove opening, having a second guide ring attached to it, and having a central hole and a threaded hub attached to the plate, said hub being threaded onto said rod and being located on a side of said second plate which faces said handle;
   f. a closure nut threaded onto said rod at the end of the rod opposite the handle and adjacent to said second plate, said nut having means to prevent it from rotating on said rod after the nut has been initially threaded onto the rod;
   g. said first guide ring, which is a hollow cylinder having a diameter less than that of said plates, having a first end attached to said first plate, and having a length which defines the minimum spacing between said first plate and said second plate, where the central axis of the ring coincides with said rod and where the ring has a slot extending along its length parallel to its axis;
   h. said second guide ring, which is a hollow cylinder having an outer diameter slightly less than the inner diameter of said first guide ring such that it will slide inside said first guide ring, having a length less than the length of said first guide ring, and having a first end attached to said second plate, where the central axis of the ring coincides with said rod, where the ring has a slot extending along its length which corresponds with said slot in said first guide ring, and where the ring will slide inside of said first guide ring; and
   i. an inflated inner tube mounted between said plates, having an axis which coincides with said rod, an outer diameter greater than the diameters of said plates, and an inner diameter approximately equal to the outer diameter of said first guide ring, where the air fill nozzle of said tube is located in said first and second guide ring slots.

* * * * *